United States Patent
Rothman et al.

(10) Patent No.: US 10,852,988 B2
(45) Date of Patent: Dec. 1, 2020

(54) ON ACCESS MEMORY ZEROING

(71) Applicant: Intel Corporation, Santa Clara, CA (US)

(72) Inventors: Michael Rothman, Puyallup, WA (US); Vincent Zimmer, Federal Way, WA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/966,469

(22) Filed: Apr. 30, 2018

(65) Prior Publication Data

US 2019/0042141 A1    Feb. 7, 2019

(51) Int. Cl.
*G06F 3/06* (2006.01)

(52) U.S. Cl.
CPC ............ *G06F 3/0652* (2013.01); *G06F 3/061* (2013.01); *G06F 3/0604* (2013.01); *G06F 3/064* (2013.01); *G06F 3/0659* (2013.01); *G06F 3/0673* (2013.01); *G06F 3/0679* (2013.01)

(58) Field of Classification Search
CPC ............ G06F 21/6218; G06F 21/6209; G06F 2221/2149; G06F 2221/2147; G06F 2221/2143; G06F 12/14; G06F 12/1425; G06F 12/145; G06F 12/1416; G06F 12/1458; G06F 12/1433; G06F 12/1441; G06F 3/0652; G06F 3/0604; G06F 3/061; G06F 3/064; G06F 3/0659; G06F 3/0673; G06F 3/0679; G06F 12/02
See application file for complete search history.

(56) References Cited

U.S. PATENT DOCUMENTS

| | | | |
|---|---|---|---|
| 7,627,723 B1 | 12/2009 | Buck et al. | |
| 2005/0255667 A1 | 11/2005 | Arghavani et al. | |
| 2008/0189342 A1* | 8/2008 | Bhattacharya | G06F 16/10 |
| 2011/0088084 A1* | 4/2011 | Yasaki | G06F 21/6218 |
| | | | 726/5 |
| 2012/0042130 A1* | 2/2012 | Peapell | G06F 12/0866 |
| | | | 711/126 |
| 2013/0132690 A1 | 5/2013 | Epstein | |
| 2013/0198246 A1* | 8/2013 | Scales | G06F 3/0608 |
| | | | 707/821 |

(Continued)

FOREIGN PATENT DOCUMENTS

WO    2016-153725 A1    9/2016

OTHER PUBLICATIONS

Casey, H.T., "How to dramatically cut your windows 10 PC's boot time", Mar. 9, 2016, laptopmag.com/articles/speed-windows-10-boot-time, 8 pages.

(Continued)

*Primary Examiner* — William E. Baughman
(74) *Attorney, Agent, or Firm* — Jordan IP Law, LLC

(57) ABSTRACT

An embodiment of a semiconductor package apparatus may include technology to determine one or more filtered memory locations of a memory, determine if a read access for the memory corresponds to the one or more filtered memory locations, and return a pre-determined filter value as a result of the read access if the read access is determined to correspond to the one or more filtered memory locations. Other embodiments are disclosed and claimed.

25 Claims, 7 Drawing Sheets

(56) References Cited

U.S. PATENT DOCUMENTS

| | | | |
|---|---|---|---|
| 2013/0254494 A1* | 9/2013 | Oxford | G06F 12/1466 |
| | | | 711/145 |
| 2014/0006737 A1* | 1/2014 | Teh | G06F 12/1475 |
| | | | 711/163 |
| 2014/0325656 A1 | 10/2014 | Sallam | |
| 2015/0006818 A1* | 1/2015 | Kobashi | G06F 3/0617 |
| | | | 711/114 |
| 2017/0090815 A1* | 3/2017 | Kelner | G06F 3/0619 |

OTHER PUBLICATIONS

International Search Report and Written Opinion for International Patent Application No. PCT/US2019/022955, dated Jul. 2, 2019, 11 pages.

\* cited by examiner

ON ACCESS MEMORY ZEROING

TECHNICAL FIELD

Embodiments generally relate to memory systems. More particularly, embodiments relate to on access memory zeroing.

BACKGROUND

Various electronic devices and/or computing systems may include memory components. In some systems, it may be beneficial or desirable to zero the contents of such memory components prior to making the system available for use. Depending on the amount of memory, such zeroing of the memory may cause undesirable latency in the availability of the system.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level PCM, a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
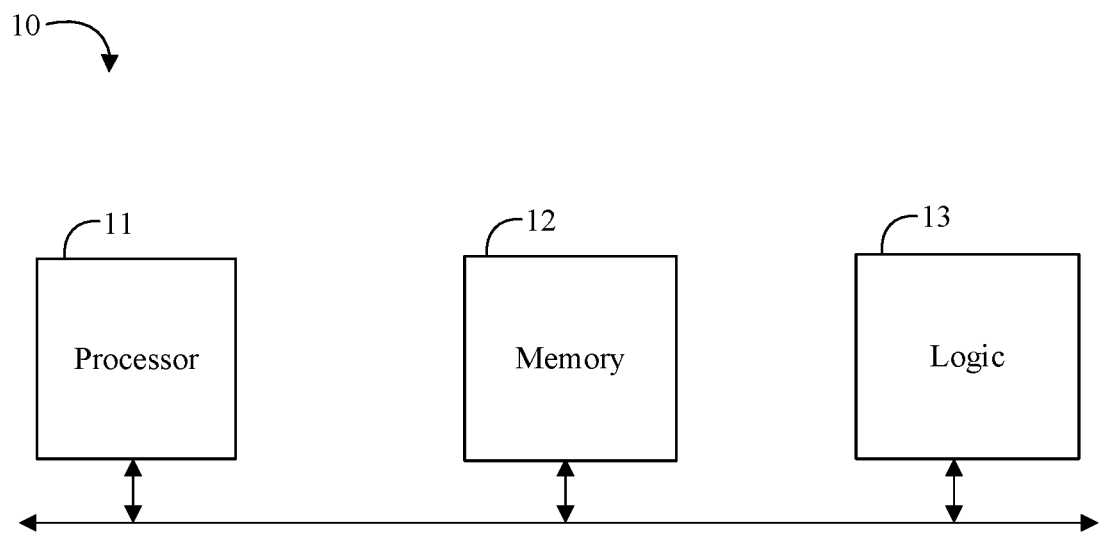
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the memory 12 to determine one or more filtered memory locations of the memory 12, determine if a read access for the memory 12 corresponds to the one or more filtered memory locations, and return a pre-determined filter value as a result of the read access if the read access is determined to correspond to the one or more filtered memory locations. The logic 13 may also be configured to determine if a write access for the memory 12 corresponds to the one or more filtered memory locations of the memory 12, update a memory location corresponding to the write access, and remove the memory location from the one or more filtered memory locations. In some embodiments, the logic 13 may be further configured to provide a table of the one or more filtered memory locations to represent as set to the pre-determined filter value based on a memory map of the memory 12, and to provide an indication to an operating system (OS) that the memory 12 has been set to the pre-determined filter value after the table of the one or more filtered memory locations is complete. For example, the logic 13 may be configured to provide a virtual machine monitor (VMM) to trap accesses to the memory and mask memory values for memory locations that correspond to the one or more filtered memory locations of the memory 12 (e.g., a hypervisor). In some embodiments, the pre-determined filter value may correspond to a zero value (e.g., to effectively zero the memory 12). In other embodiments, the pre-determined filter value may correspond to a value of all ones (e.g., a byte value of 11111111), or some other value(s) as may be necessary or beneficial for a particular system (e.g., alternating 1s and 0s). In some embodiments, the logic 13 may be located in, or co-located with, various components, including the processor 11 (e.g., on a same die).

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, determining one or more filtered memory locations, determining if a read access corresponds to the one or more filtered memory locations, returning the pre-determined filter value as a result of the read access, etc.).

Figure 2:
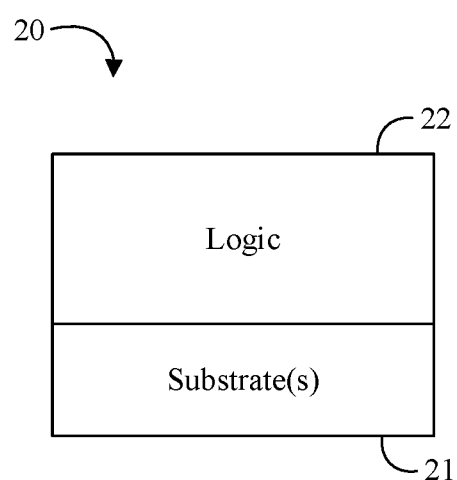
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to determine one or more filtered memory locations of a memory, determine if a read access for the memory corresponds to the one or more filtered memory locations, and return a pre-determined filter value as a result of the read access if the read access is determined to correspond to the one or more filtered memory locations. The logic 22 may also be configured to determine if a write access for the memory corresponds to the one or more filtered memory locations of the memory, update a memory location corresponding to the write access, and remove the memory location from the one or more filtered memory locations. In some embodiments, the logic 22 may be further configured to provide a table of the one or more filtered memory locations to represent as set to the pre-determined filter value based on a memory map of the memory, and to provide an indication to an OS that the memory has been set to the pre-determined filter value after the table of the one or more filtered memory locations is complete. For example, the logic 22 may be configured to provide a VMM (e.g., a hypervisor) to trap accesses to the memory and mask memory values for memory locations that correspond to the one or more filtered memory locations of the memory. In some embodiments, the pre-determined filter value may correspond to a zero value (e.g., to effectively zero the memory). In some embodiments, the logic 22 may be located in, or co-located with, various components, including a processor, controller, micro-controller, etc. (e.g., on the same substrate(s) 21). In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
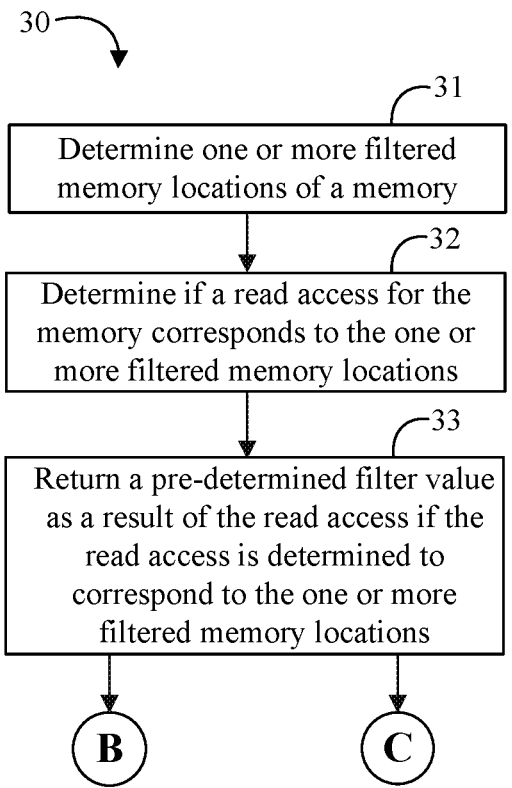
FIGS. 3A to 3C are flowcharts of an example of a method of controlling memory according to an embodiment.
Figure 3B:
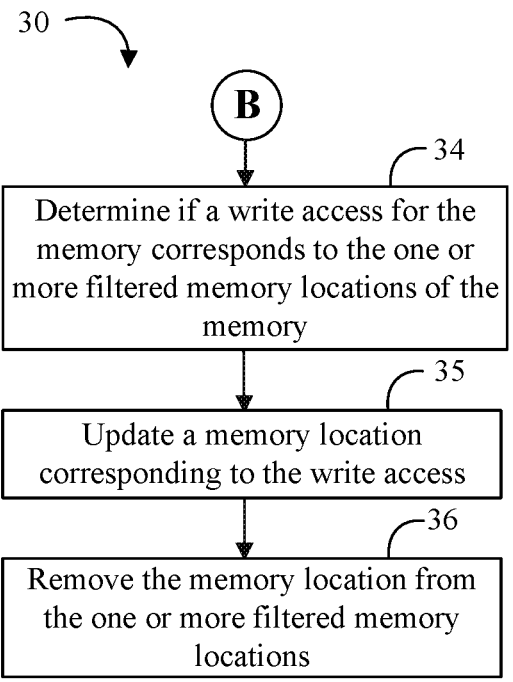
Figure 3C:
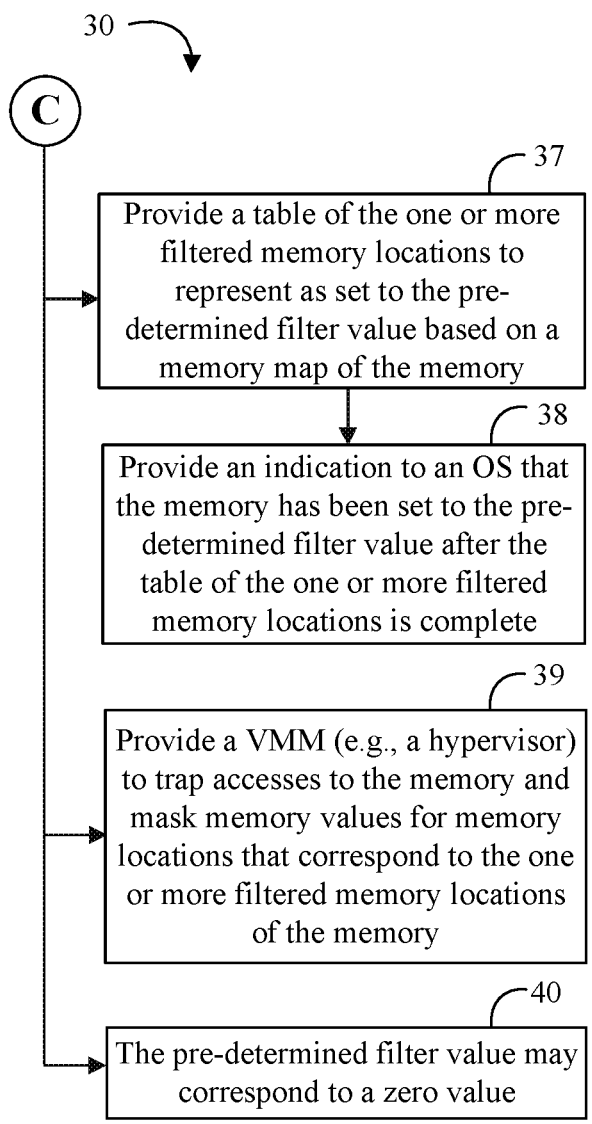

Turning now to FIGS. 3A to 3C, an embodiment of a method 30 of controlling memory may include determining one or more filtered memory locations of a memory at block 31, determining if a read access for the memory corresponds to the one or more filtered memory locations at block 32, and returning a pre-determined filter value as a result of the read access if the read access is determined to correspond to the one or more filtered memory locations at block 33. The method 30 may also include determining if a write access for the memory corresponds to the one or more filtered memory locations of the memory at block 34, updating a memory location corresponding to the write access at block 35, and removing the memory location from the one or more filtered memory locations at block 36. Some embodiments of the method 30 may further include providing a table of the one or more filtered memory locations to represent as set to the pre-determined filter value based on a memory map of the memory at block 37, and providing an indication to an OS that the memory has been set to the pre-determined filter value after the table of the one or more filtered memory locations is complete at block 38. Some embodiments of the method 30 may also include providing a VMM (e.g., a hypervisor) to trap accesses to the memory and mask memory values for memory locations that correspond to the one or more filtered memory locations of the memory at block 39. For example, the pre-determined filter value may correspond to a zero value at block 40.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable storage medium as described in connection with Examples 20 to 25 below. Embodiments or portions of the method 30 may be implemented in firmware, applications (e.g., through an application programming interface (API)), or driver software running on an operating system (OS).

Some embodiments may advantageously provide dynamic memory zeroing during platform initialization. Computer components and/or platforms may generally tend to get faster, more powerful, and include more resources (e.g., memory and/or storage capacity). Such advances may not necessarily be apparent to the end user in terms of boot times and/or latency until a system is available to use. Even with a faster system, for example, the performance increase may be negated by the additional resources that need to be initialized.

In some systems, for example, the OS and/or hypervisors may require zeroing of the memory for correct logical operation. In another example, some systems may include setting syndromes in error correction code (ECC) which may require zeroing of the memory in order have consistent settings. The memory zeroing problem may be exacerbated in a system with large memory capacity per socket (e.g., multiple terabytes in some systems). Some embodiments may advantageously reduce or eliminate latency due to memory zeroing. For example, some embodiments may provide a table published by the platform firmware that represents to the OS which memory has already been zeroed, and may obviate the need to perform the zeroing. In some other systems, zeroing memory may be time intensive irrespective of which actor does the work (e.g., firmware versus OS). Advantageously, some embodiments may provide firmware with an efficient technology for on-access zeroing. For example, in some embodiments a small hypervisor may provide on demand zeroing. Some embodiments may include a thin virtualization agent in a pre-OS environment to trap memory accesses. In some embodiments, the virtualization agent may provide efficient, on-access zeroing under a full hypervisor via recursive virtualization.

Some other systems with large memory arrays may utilize a host CPU routine to set memory contents to zero prior to usage, which may become a serialization point for having a usable OS (e.g., taking anywhere from several seconds to several minutes depending on the size of the memory array). The amount of time it takes for the zeroing on larger systems may be a detriment to mission critical operations for larger platforms. Some quality of service and/or reliability standards of performance may be based on uptime (e.g., a machine may be offline no more than 5½ minutes per year). When zeroing of large memory arrays takes minutes, the bottleneck may inhibit any form of regular maintenance upkeep which requires restarts, because the system can't afford the downtime and still meet such standards. Accordingly, the restart time may be important to meet such standards. Some embodiments may advantageously include technology in a zero hypervisor to zero the memory on demand and provide a signal to the OS that the memory ranges are already zeroed (e.g., a compatible legacy or standard indication may signal the OS that the memory is zeroed) such that the OS may be launched with little or no delay due to memory zeroing. Although relatively more time may be saved in server or datacenter applications, some embodiments may be similarly applicable to client devices such as personal computers, laptop computers, notebook computers, tablets, smartphones, etc. Many applications may benefit from the faster boot time provided by some embodiments, including vehicle computers, self-driving cars, etc.

When a platform boots and passes control to the OS, the platform may defensively zero memory before using the memory to avoid malicious and/or inadvertent attacks. The larger the memory usage (e.g., in servers, configurations may be in excess of a terabyte), the more that a runtime slowdown may be perceived. In addition, when an OS restarts the platform, it is extremely important for security purposes than any secrets contained in the memory have been wiped. Some embodiments may advantageously provide logic between the platform BIOS and an underlying zero hypervisor to provide technology for the platform to assure that memory has been zeroed with little or no time delays. For example, some embodiments may create an intelligent filter that a memory controller may use to mask access to memory. If a memory access is determined to be within the filter, zero will be read from the filtered memory location (e.g., instead of any actual memory value stored at the requested memory location). In some embodiments, actual zeroing of memory locations may be performed in the background. When a filtered memory location has actually been written with zeroes (or otherwise zeroed) in the background, the indication that the memory location is filtered may be removed.

Figure 4:
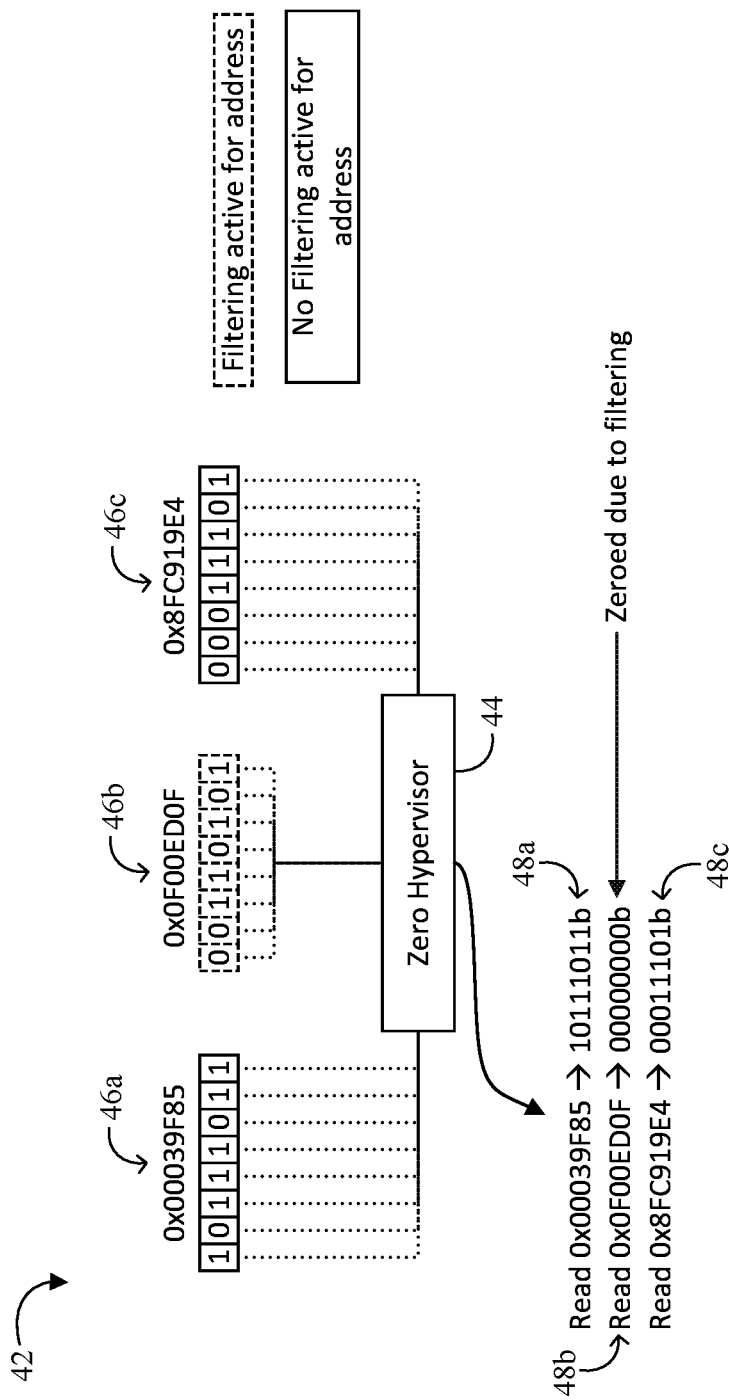
FIG. 4 is an illustrative diagram of an example of a process flow for on access zeroing according to an embodiment.

Turning now to FIG. 4, an embodiment of a process flow 42 for on access zeroing may include providing a zero hypervisor 44 between memory read accesses 46a-c and corresponding results 48a-c of the memory read accesses 46a-c. The zero hypervisor 44 may determine whether filtering is active for addresses of the memory read accesses 46a-c. For example, filtering may be active for memory read access 46b, but inactive for memory read accesses 46a and 46c. The zero hypervisor 44 may return a result 48b of zero for the filtered memory read access 46b (e.g., without ever performing a read of the memory address), and return actual results for the unfiltered memory read accesses. The addresses for active filtering may be determined by the platform BIOS and provided to the zero hypervisor to provide technology for the platform to assure that memory has been effectively zeroed with little or no time delays incurred by zeroing the memory. The zero hypervisor may mask access to the memory such that reads from actively filtered memory locations will return zero. After a filtered memory location has been properly written, the active filtering may be discontinued for that memory location. Advantageously, some embodiments may provide a near-instant ability to initiate a restart and may ensure that memory-contained secrets have been wiped from any user of the system.

The bookkeeping granularity of the filter may be based on any suitable memory boundary size (e.g., byte, word, block, page, etc.). The granularity may be selected based on platform/system/component performance needs and/or the zero hypervisor implementation. For many applications, the granularity of memory locations maintained by the filter may be selected based on page size boundaries. For example, a bitmap may be mapped to the system memory map with each bit representing a page of the memory. A bit value of zero (0) may represent a filtered page of the memory (e.g., a page which has not yet been written with valid data), while a bit value of one (1) may represent an unfiltered page of the memory (e.g., a page which has been written with valid data). Those skilled in the art will appreciate that numerous other data/memory structures may be used to represent a table or list of filtered memory locations. If a granularity of a valid memory write operation is different from a granularity of the filter bookkeeping, in some embodiments the remainder of the memory locations indicated by the filter may be zeroed before the memory location(s) are removed from the filter.

Figure 5:
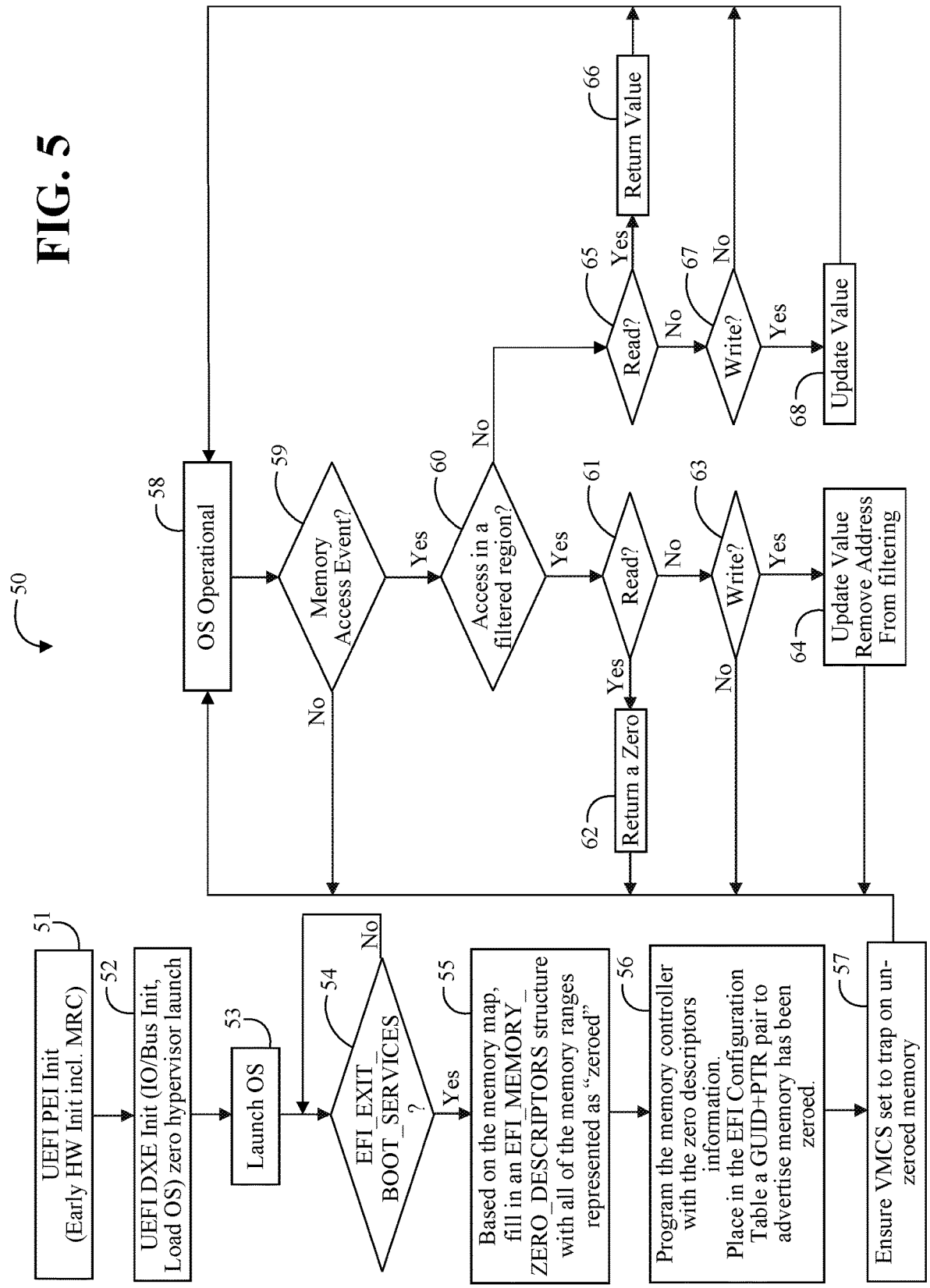
FIG. 5 is a flowchart of an example of a method of booting an electronic processing system according to an embodiment.

Turning now to FIG. 5, an embodiment of a method 50 of booting an electronic processing system may include starting with a unified extensible firmware interface (UEFI) pre-EFI initialization (e.g., an early hardware (HW) initialization including memory reference code (MRC), etc.) at block 51, a UEFI driver execution environment (DXE) initialization (e.g., IO/bus initialization, load OS, etc.) and zero hypervisor launch at block 52, and launching the OS at block 53. The method 50 may then include determining when the EFI boot is complete based on the state of EFI_EXIT_BOOT_SERVICES at block 54. When the EFI boot is complete, the method may proceed, based on the memory map, to filling in an EFI_MEMORY_ZERO_DESCRIPTORS structure with all of the memory ranges that are to be represented as zeroed at block 55. The method 50 may then include programming the memory controller with the zero descriptors information, and placing a GUID+PTR pair in the EFI Configuration Table to indicate that the memory has been zeroed at block 56. The method 50 may then include ensuring that the virtual machine control structure (VMCS) is set to trap on un-zeroed memory at block 57, and proceed to an OS operational state at block 58. An example pseudo-code for the EFI_MEMORY_ZERO_DESCRIPTORS may be as follows:

```
typedef struct {
    EFI_PHYSICAL_ADDRESS    Address;
    UINT64                  Length;
} EFI_SCATTER_GATHER_RANGE;
typedef struct {
    UINT64                  NumberOfMemoryRanges;
    EFI_SCATTER_GATHER_RANGE MemoryRanges[ ];
} EFI_MEMORY_ZERO_DESCRIPTORS;
```

While the OS is running at block 58, the method 50 may include determining that a memory access event occurred at block 59. If so, the method 50 may include determining if the memory access corresponds to a filtered region at block 60. If so, the method 50 may include determining if the memory access event corresponds to a read event at block 61 and, if so, returning a zero value at block 62, after which the method 50 may return to the OS operational state at block 58. If the memory access event does not correspond to a read event at block 61, the method 50 may include determining if the memory access event corresponds to a write event at block 63 and, if so, the method 50 may include updating the value at the corresponding memory address and remove the memory address from filtering at block 64 (e.g., including, in some embodiments, zeroing additional memory addresses as needed to match the granularity of the filter), after which the method 50 may return to the OS operational state at block 58. As noted above, the bookkeeping granularity for the filter may be any suitable size, including corresponding to a memory page size of the system.

If the method 50 determines that the access is not in a filtered region at block 60, the method 50 may include determining if the access is a read at block 65 and, if so, return the read value at block 66, after which the method 50 may return to the OS operational state at block 58. Otherwise, the method may include determine if the access is a write at block 67 and, if so, the method 50 may include updating the memory address with the value at block 68, and then returning to normal OS operation at block 58.

In some embodiments, filter information including the filter list/table may be maintained in persistent memory such that the filter information remains valid following a power cycle. For example, the filter information may be stored in non-volatile memory, in battery-backed volatile memory, or in volatile memory which gets backed up to persistent storage during a controlled shutdown. When the filter information is maintained in volatile memory, some embodiments may set a flag in persistent memory to indicate whether the filter information is valid. For example, the flag may be set to RESUME_FILTER_INVALID whenever a change is made to the filter information that is not backed up and may be set to RESUME_FILTER_VALID following a successful backup of the filter information. The boot process during a resume after an unexpected power loss or a power cycle may check the state of the flag to determine if the memory may be represented as zeroed and the restored filter information may be used, or if the filter information should be re-initialized. Providing technology to persistently maintain the filter information may be important for systems where the memory ranges associated with the filter include non-volatile memory which may store sensitive information which should be zeroed following an unexpected power loss.

Figure 6A:
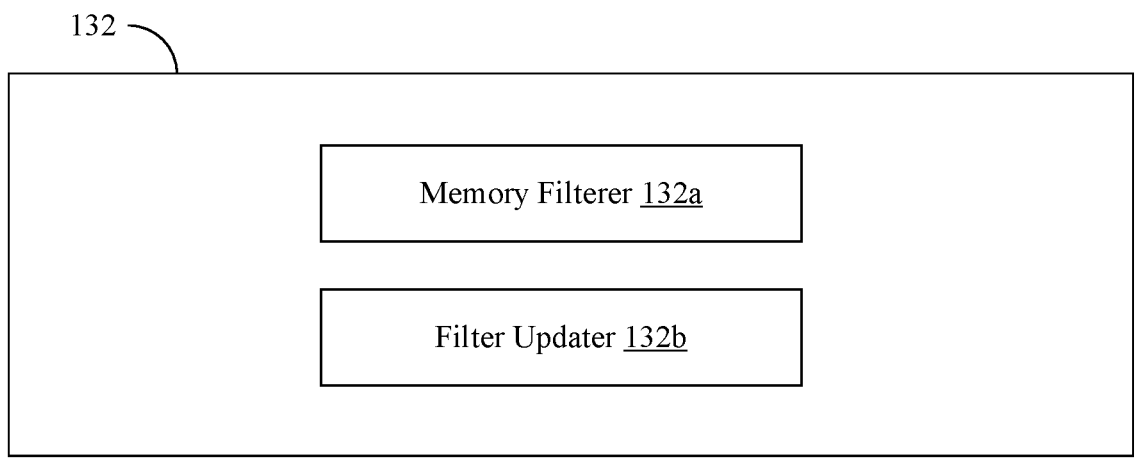
FIGS. 6A and 6B are block diagrams of examples of zero hypervisor apparatuses according to embodiments.

FIG. 6A shows a zero hypervisor apparatus 132 (132a-132b) that may implement one or more aspects of the method 30 (FIGS. 3A to 3C), the process flow 42 (FIG. 4), and/or the method 50 (FIG. 5). The zero hypervisor apparatus 132, which may include logic instructions, configurable logic, fixed-functionality hardware logic, may be readily substituted for the logic 13 (FIG. 1), already discussed. A memory filterer 132a may include technology to determine one or more filtered memory locations of a memory, determine if a read access for the memory corresponds to the one or more filtered memory locations, and return a pre-determined filter value as a result of the read access if the read access is determined to correspond to the one or more filtered memory locations. A filter updater 132b may include technology to determine if a write access for the memory corresponds to the one or more filtered memory locations of the memory, update a memory location corresponding to the write access, and remove the memory location from the one or more filtered memory locations. In some embodiments, the memory filterer 132a may be further configured to provide a table of the one or more filtered memory locations to represent as set to the pre-determined filter value based on a memory map of the memory, and to provide an indication to an OS that the memory has been set to the pre-determined filter value after the table of the one or more filtered memory locations is complete. For example, the zero hypervisor apparatus 132 may be configured to provide a VMM (e.g., a hypervisor) to trap accesses to the memory and mask memory values for memory locations that correspond to the one or more filtered memory locations of the memory. In some embodiments, the pre-determined filter value may correspond to a zero value (e.g., to effectively zero the memory)

Figure 6B:
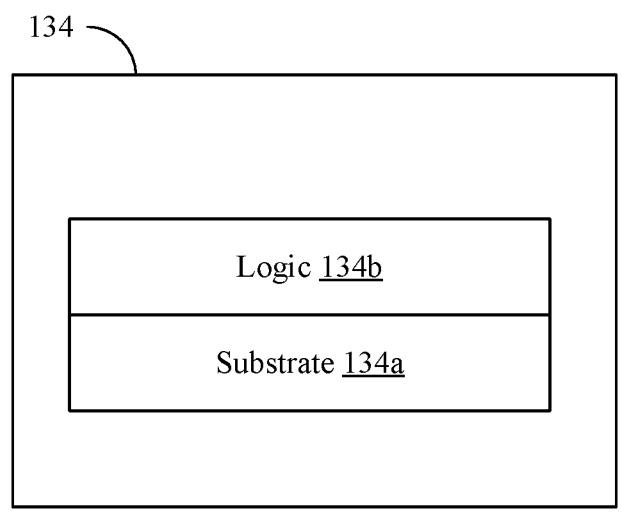

Turning now to FIG. 6B, zero hypervisor apparatus 134 (134a, 134b) is shown in which logic 134b (e.g., transistor array and other integrated circuit/IC components) is coupled to a substrate 134a (e.g., silicon, sapphire, gallium arsenide). The logic 134b may generally implement one or more aspects of the method 30 (FIGS. 3A to 3C), the process flow 42 (FIG. 4), and/or the method 50 (FIG. 5). Thus, the logic 134b may determine one or more filtered memory locations of a memory, determine if a read access for the memory corresponds to the one or more filtered memory locations, and return a pre-determined filter value as a result of the read access if the read access is determined to correspond to the one or more filtered memory locations. The logic 134b may also be configured to determine if a write access for the memory corresponds to the one or more filtered memory locations of the memory, update a memory location corresponding to the write access, and remove the memory location from the one or more filtered memory locations. In some embodiments, the logic 134b may be further configured to provide a table of the one or more filtered memory locations to represent as set to the pre-determined filter value based on a memory map of the memory, and to provide an indication to an OS that the memory has been set to the pre-determined filter value after the table of the one or more filtered memory locations is complete. For example, the logic 134b may be configured to provide a VMM (e.g., a hypervisor) to trap accesses to the memory and mask memory values for memory locations that correspond to the one or more filtered memory locations of the memory. In some embodiments, the pre-determined filter value may correspond to a zero value (e.g., to effectively zero the memory). In one example, the apparatus 134 is a semiconductor die, chip and/or package.

Figure 7:
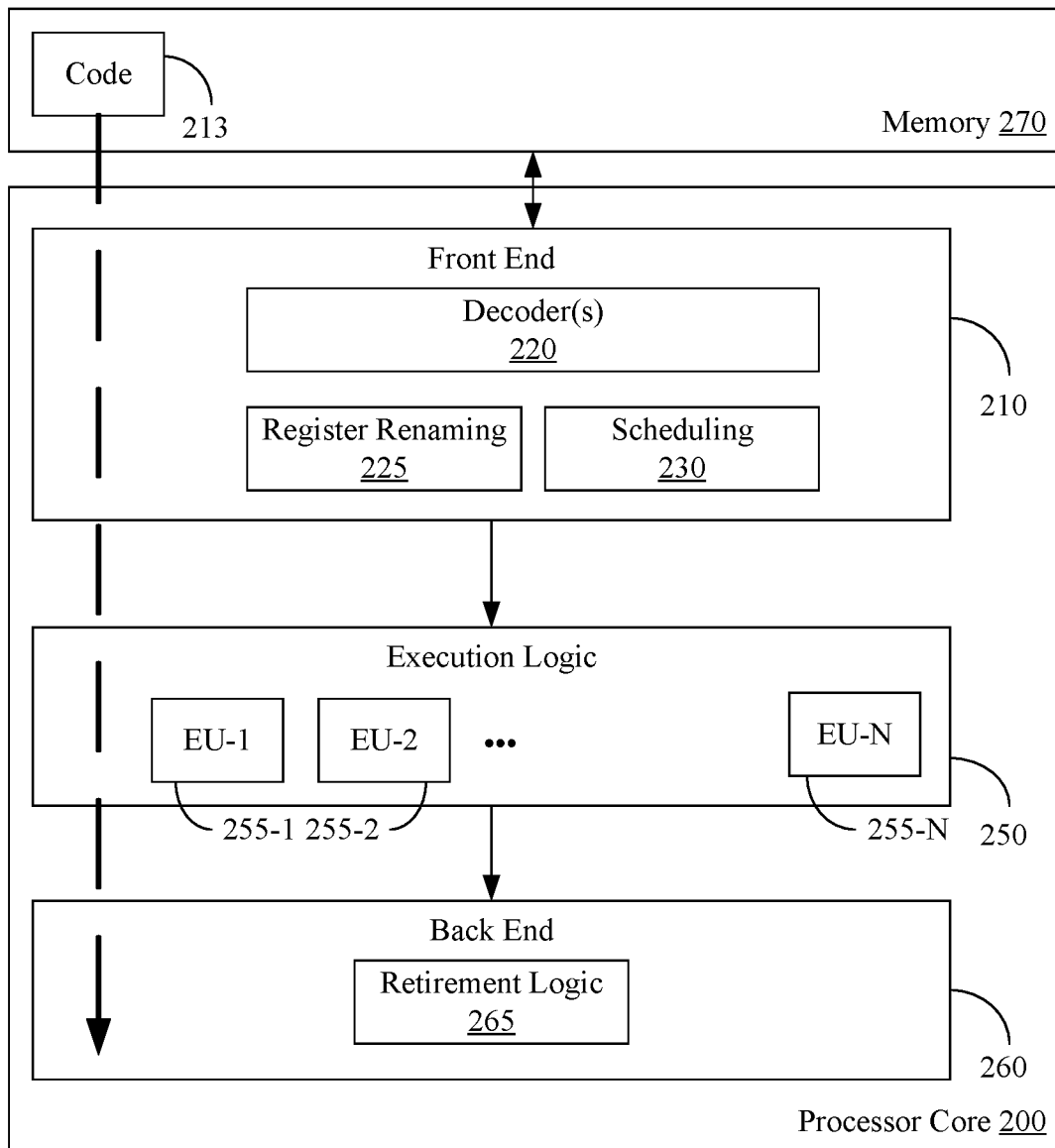
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIGS. 3A to 3C), the process flow 42 (FIG. 4), and/or the method 50 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
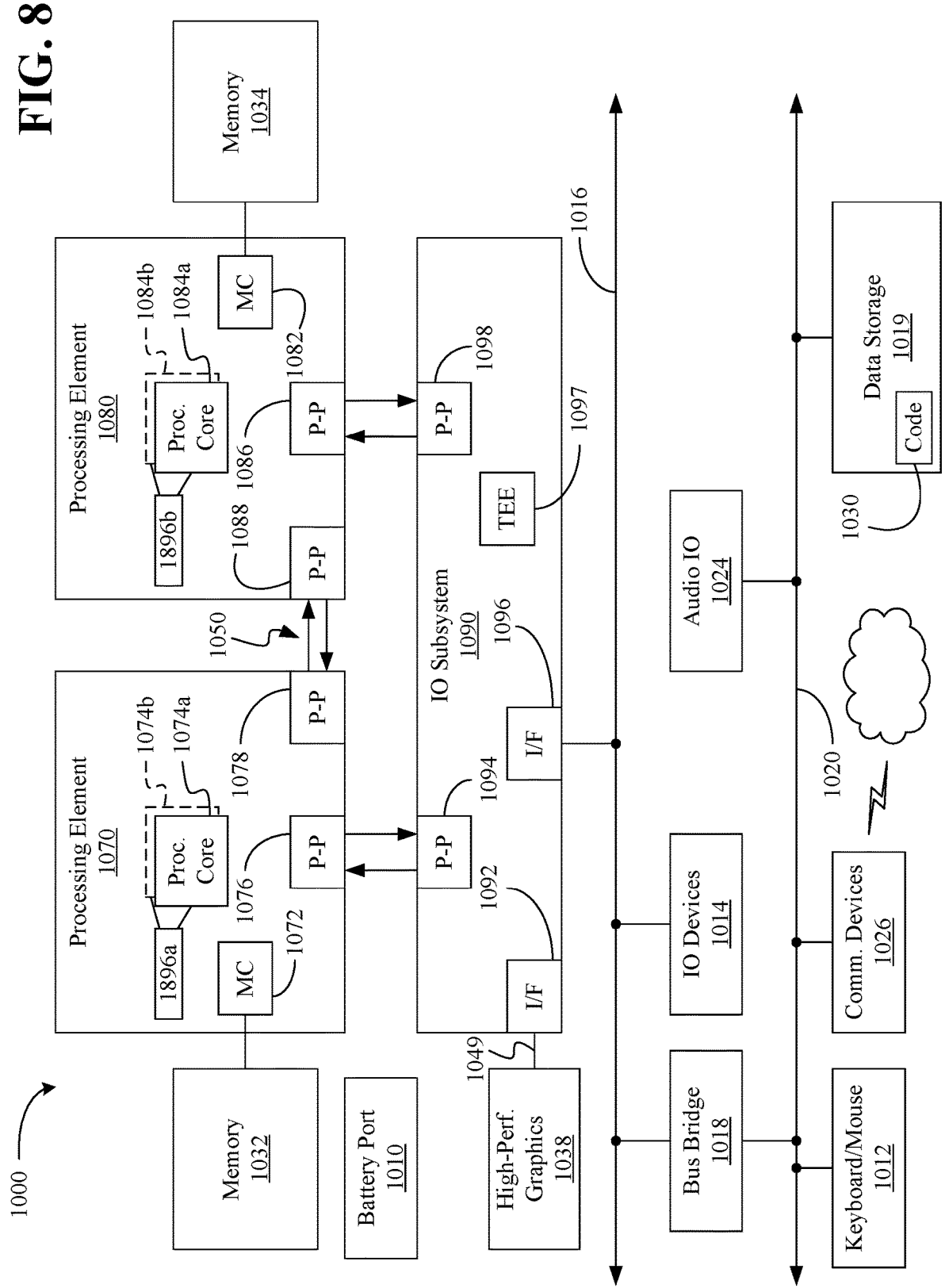
FIG. 8 is a block diagram of an example of a system according to an embodiment.

Referring now to FIG. 8, shown is a block diagram of a system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 30 (FIGS. 3A to 3C), the process flow 42 (FIG. 4), and/or the method 50 (FIG. 5), already discussed, and may be similar to the code 213 (FIG. 7), already discussed. Further, an audio I/O 1024 may be coupled to second bus 1020.

Note that other embodiments are contemplated. For example, instead of the point-to-point architecture of FIG. 8, a system may implement a multi-drop bus or another such communication topology.

ADDITIONAL NOTES AND EXAMPLES

Example 1 may include an electronic processing system, comprising a processor, memory communicatively coupled to the processor, and logic communicatively coupled to the memory to determine one or more filtered memory locations of the memory, determine if a read access for the memory corresponds to the one or more filtered memory locations, and return a pre-determined filter value as a result of the read access if the read access is determined to correspond to the one or more filtered memory locations.

Example 2 may include the system of Example 1, wherein the logic is further to determine if a write access for the memory corresponds to the one or more filtered memory locations of the memory, update a memory location corresponding to the write access, and remove the memory location from the one or more filtered memory locations.

Example 3 may include the system of Example 1, wherein the logic is further to provide a table of the one or more filtered memory locations to represent as set to the pre-determined filter value based on a memory map of the memory.

Example 4 may include the system of Example 3, wherein the logic is further to provide an indication to an operating system that the memory has been set to the pre-determined filter value after the table of the one or more filtered memory locations is complete.

Example 5 may include the system of Example 4, wherein the logic is further to provide a virtual machine monitor to trap accesses to the memory and mask memory values for memory locations that correspond to the one or more filtered memory locations of the memory.

Example 6 may include the system of any of Examples 1 to 5, wherein the pre-determined filter value corresponds to a zero value.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to determine one or more filtered memory locations of a memory, determine if a read access for the memory corresponds to the one or more filtered memory locations, and return a pre-determined filter value as a result of the read access if the read access is determined to correspond to the one or more filtered memory locations.

Example 8 may include the apparatus of Example 7, wherein the logic is further to determine if a write access for the memory corresponds to the one or more filtered memory locations of the memory, update a memory location corresponding to the write access, and remove the memory location from the one or more filtered memory locations.

Example 9 may include the apparatus of Example 7, wherein the logic is further to provide a table of the one or more filtered memory locations to represent as set to the pre-determined filter value based on a memory map of the memory.

Example 10 may include the apparatus of Example 9, wherein the logic is further to provide an indication to an operating system that the memory has been set to the pre-determined filter value after the table of the one or more filtered memory locations is complete.

Example 11 may include the apparatus of Example 10, wherein the logic is further to provide a virtual machine monitor to trap accesses to the memory and mask memory values for memory locations that correspond to the one or more filtered memory locations of the memory.

Example 12 may include the apparatus of any of Examples 7 to 11, wherein the pre-determined filter value corresponds to a zero value.

Example 13 may include the apparatus of any of Examples 7 to 11, wherein the logic coupled to the one or more substrates includes transistor channel regions that are positioned within the one or more substrates.

Example 14 may include a method of controlling memory, comprising determining one or more filtered memory locations of a memory, determining if a read access for the memory corresponds to the one or more filtered memory locations, and returning a pre-determined filter value as a result of the read access if the read access is determined to correspond to the one or more filtered memory locations.

Example 15 may include the method of Example 14, further comprising determining if a write access for the memory corresponds to the one or more filtered memory locations of the memory, updating a memory location corresponding to the write access, and removing the memory location from the one or more filtered memory locations.

Example 16 may include the method of Example 14, further comprising providing a table of the one or more filtered memory locations to represent as set to the pre-determined filter value based on a memory map of the memory.

Example 17 may include the method of Example 16, further comprising providing an indication to an operating system that the memory has been set to the pre-determined filter value after the table of the one or more filtered memory locations is complete.

Example 18 may include the method of Example 17, further comprising providing a virtual machine monitor to trap accesses to the memory and mask memory values for memory locations that correspond to the one or more filtered memory locations of the memory.

Example 19 may include the method of any of Examples 14 to 18, wherein the pre-determined filter value corresponds to a zero value.

Example 20 may include at least one computer readable storage medium, comprising a set of instructions, which when executed by a computing device, cause the computing device to determine one or more filtered memory locations of a memory, determine if a read access for the memory corresponds to the one or more filtered memory locations, and return a pre-determined filter value as a result of the read access if the read access is determined to correspond to the one or more filtered memory locations.

Example 21 may include the at least one computer readable storage medium of Example 20, comprising a further set of instructions, which when executed by the computing device, cause the computing device to determine if a write access for the memory corresponds to the one or more filtered memory locations of the memory, update a memory location corresponding to the write access, and remove the memory location from the one or more filtered memory locations.

Example 22 may include the at least one computer readable storage medium of Example 20, comprising a further set of instructions, which when executed by the computing device, cause the computing device to provide a table of the one or more filtered memory locations to represent as set to the pre-determined filter value based on a memory map of the memory.

Example 23 may include the at least one computer readable storage medium of Example 22, comprising a further set of instructions, which when executed by the computing device, cause the computing device to provide an indication to an operating system that the memory has been set to the pre-determined filter value after the table of the one or more filtered memory locations is complete.

Example 24 may include the at least one computer readable storage medium of Example 23, comprising a further set of instructions, which when executed by the computing device, cause the computing device to provide a virtual machine monitor to trap accesses to the memory and mask memory values for memory locations that correspond to the one or more filtered memory locations of the memory.

Example 25 may include the at least one computer readable storage medium of any of Examples 20 to 24, wherein the pre-determined filter value corresponds to a zero value.

Example 26 may include a memory controller apparatus, comprising means for determining one or more filtered memory locations of a memory, means for determining if a read access for the memory corresponds to the one or more filtered memory locations, and means for returning a pre-determined filter value as a result of the read access if the read access is determined to correspond to the one or more filtered memory locations.

Example 27 may include the apparatus of Example 26, further comprising means for determining if a write access for the memory corresponds to the one or more filtered memory locations of the memory, means for updating a memory location corresponding to the write access, and means for removing the memory location from the one or more filtered memory locations.

Example 28 may include the apparatus of Example 26, further comprising means for providing a table of the one or more filtered memory locations to represent as set to the pre-determined filter value based on a memory map of the memory.

Example 29 may include the apparatus of Example 28, further comprising means for providing an indication to an operating system that the memory has been set to the pre-determined filter value after the table of the one or more filtered memory locations is complete.

Example 30 may include the apparatus of Example 29, further comprising means for providing a virtual machine monitor to trap accesses to the memory and mask memory values for memory locations that correspond to the one or more filtered memory locations of the memory.

Example 31 may include the apparatus of any of Examples 26 to 30, wherein the pre-determined filter value corresponds to a zero value.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
   a processor;
   memory communicatively coupled to the processor; and
   logic communicatively coupled to the memory to:
      determine filtered memory locations of the memory that correspond to a filter having a filter granularity,
      determine if a read access for the memory corresponds to the filtered memory locations,
      return a pre-determined filter value as a result of the read access in response to the read access being determined to correspond to the filtered memory locations and bypass a write operation of the pre-determined filter value to the filtered memory locations in response to the read access,
      determine that a write access for the memory corresponds to a first memory location of the filtered memory locations of the memory such that the write access is to write to the first memory location but not one or more additional memory locations of the filtered memory locations,
      conduct a determination that a write granularity of the write access is to be different than the filter granularity,
      in response to the determination, identify that the one or more additional memory locations and the first memory location match the filter granularity,
      update the first memory location and the one or more additional memory locations to match the filter granularity, and
      remove the first memory location and the one or more additional memory locations from the filtered memory locations.

2. The system of claim 1, wherein the logic is further to:
   provide a table of the filtered memory locations to represent as set to the pre-determined filter value based on a memory map of the memory.

3. The system of claim 2, wherein the logic is further to:
   provide an indication to an operating system that the memory has been set to the pre-determined filter value after the table of the filtered memory locations is complete.

4. The system of claim 3, wherein the logic is further to:
   provide a virtual machine monitor to trap accesses to the memory and mask memory values for memory locations that correspond to the filtered memory locations of the memory.

5. The system of claim 1, wherein the pre-determined filter value corresponds to a zero value.

6. The system of claim 1, wherein a specific size associated with the filter granularity is the same as a combined size associated with the first memory location and the one or more additional memory locations.

7. A semiconductor package apparatus, comprising:
   one or more substrates; and
   logic coupled to the one or more substrates, wherein the logic is at least partly implemented in one or more of configurable logic or fixed-functionality logic hardware, the logic coupled to the one or more substrates to:
      determine filtered memory locations of a memory that correspond to a filter having a filter granularity,
      determine if a read access for the memory corresponds to the filtered memory locations,
      return a pre-determined filter value as a result of the read access in response to the read access being determined to correspond to the filtered memory locations and bypass a write operation of the pre-determined filter value to the filtered memory locations in response to the read access,
      determine that a write access for the memory corresponds to a first memory location of the filtered memory locations of the memory such that the write access is to write to the first memory location but not one or more additional memory locations of the filtered memory locations,
conduct a determination that a write granularity of the write access is to be different than the filter granularity,
in response to the determination, identify that the one or more additional memory locations and the first memory location match the filter granularity,
update the first memory location and the one or more additional memory locations to match the filter granularity, and
remove the first memory location and the one or more additional memory locations from the filtered memory locations.

8. The apparatus of claim 7, wherein the logic is further to:
provide a table of the filtered memory locations to represent as set to the pre-determined filter value based on a memory map of the memory.

9. The apparatus of claim 8, wherein the logic is further to:
provide an indication to an operating system that the memory has been set to the pre-determined filter value after the table of the filtered memory locations is complete.

10. The apparatus of claim 9, wherein the logic is further to:
provide a virtual machine monitor to trap accesses to the memory and mask memory values for memory locations that correspond to the filtered memory locations of the memory.

11. The apparatus of claim 7, wherein the pre-determined filter value corresponds to a zero value.

12. The apparatus of claim 7, wherein the logic coupled to the one or more substrates includes transistor channel regions that are positioned within the one or more substrates.

13. The apparatus of claim 7, wherein a specific size associated with the filter granularity is the same as a combined size associated with the first memory location and the one or more additional memory locations.

14. A method of controlling memory, comprising:
determining filtered memory locations of a memory that correspond to a filter having a filter granularity;
determining if a read access for the memory corresponds to the filtered memory locations;
returning a pre-determined filter value as a result of the read access in response to the read access being determined to correspond to the filtered memory locations and bypassing a write operation of the pre-determined filter value to the filtered memory locations in response to the read access;
determining that a write access for the memory corresponds to a first memory location of the filtered memory locations of the memory such that the write access is to write to the first memory location but not one or more additional memory locations of the filtered memory locations;
conducting a determination that a write granularity of the write access is to be different than the filter granularity;
in response to the determination, identifying that the one or more additional memory locations and the first memory location match the filter granularity;
updating the first memory location and the one or more additional memory locations to match the filter granularity; and
removing the first memory location and the one or more additional memory locations from the filtered memory locations.

15. The method of claim 14, further comprising:
providing a table of the filtered memory locations to represent as set to the pre-determined filter value based on a memory map of the memory.

16. The method of claim 15, further comprising:
providing an indication to an operating system that the memory has been set to the pre-determined filter value after the table of the filtered memory locations is complete.

17. The method of claim 16, further comprising:
providing a virtual machine monitor to trap accesses to the memory and mask memory values for memory locations that correspond to the filtered memory locations of the memory.

18. The method of claim 14, wherein the pre-determined filter value corresponds to a zero value.

19. The method of claim 14, wherein a specific size associated with the filter granularity is the same as a combined size associated with the first memory location and the one or more additional memory locations.

20. At least one non-transitory computer readable storage medium, comprising a set of instructions, which when executed by a computing device, cause the computing device to:
determine filtered memory locations of a memory that correspond to a filter having a filter granularity;
determine if a read access for the memory corresponds to the filtered memory locations;
return a pre-determined filter value as a result of the read access in response to the read access being determined to correspond to the filtered memory locations and bypass a write operation of the pre-determined filter value to the filtered memory locations in response to the read access;
determine that a write access for the memory corresponds to a first memory location of the filtered memory locations of the memory such that the write access is to write to the first memory location but not one or more additional memory locations of the filtered memory locations;
conduct a determination that a write granularity of the write access is to be different than the filter granularity,
in response to the determination, identify that the one or more additional memory locations and the first memory location match the filter granularity,
update the first memory location and the one or more additional memory locations to match the filter granularity; and
remove the first memory location and the one or more additional memory locations from the filtered memory locations.

21. The at least one non-transitory computer readable storage medium of claim 20, comprising a further set of instructions, which when executed by the computing device, cause the computing device to:
provide a table of the filtered memory locations to represent as set to the pre-determined filter value based on a memory map of the memory.

22. The at least one non-transitory computer readable storage medium of claim 21, comprising a further set of instructions, which when executed by the computing device, cause the computing device to:

provide an indication to an operating system that the memory has been set to the pre-determined filter value after the table of the filtered memory locations is complete.

23. The at least one non-transitory computer readable storage medium of claim 22, comprising a further set of instructions, which when executed by the computing device, cause the computing device to:

provide a virtual machine monitor to trap accesses to the memory and mask memory values for memory locations that correspond to the filtered memory locations of the memory.

24. The at least one non-transitory computer readable storage medium of claim 20, wherein the pre-determined filter value corresponds to a zero value.

25. The at least one non-transitory computer readable storage medium of claim 20, wherein a specific size associated with the filter granularity is the same as a combined size associated with the first memory location and the one or more additional memory locations.

* * * * *